W. M. BERING.
CYLINDER RAKE.
APPLICATION FILED FEB. 27, 1911. RENEWED AUG. 14, 1913.
1,144,992.
Patented July 6, 1915.
3 SHEETS—SHEET 1.
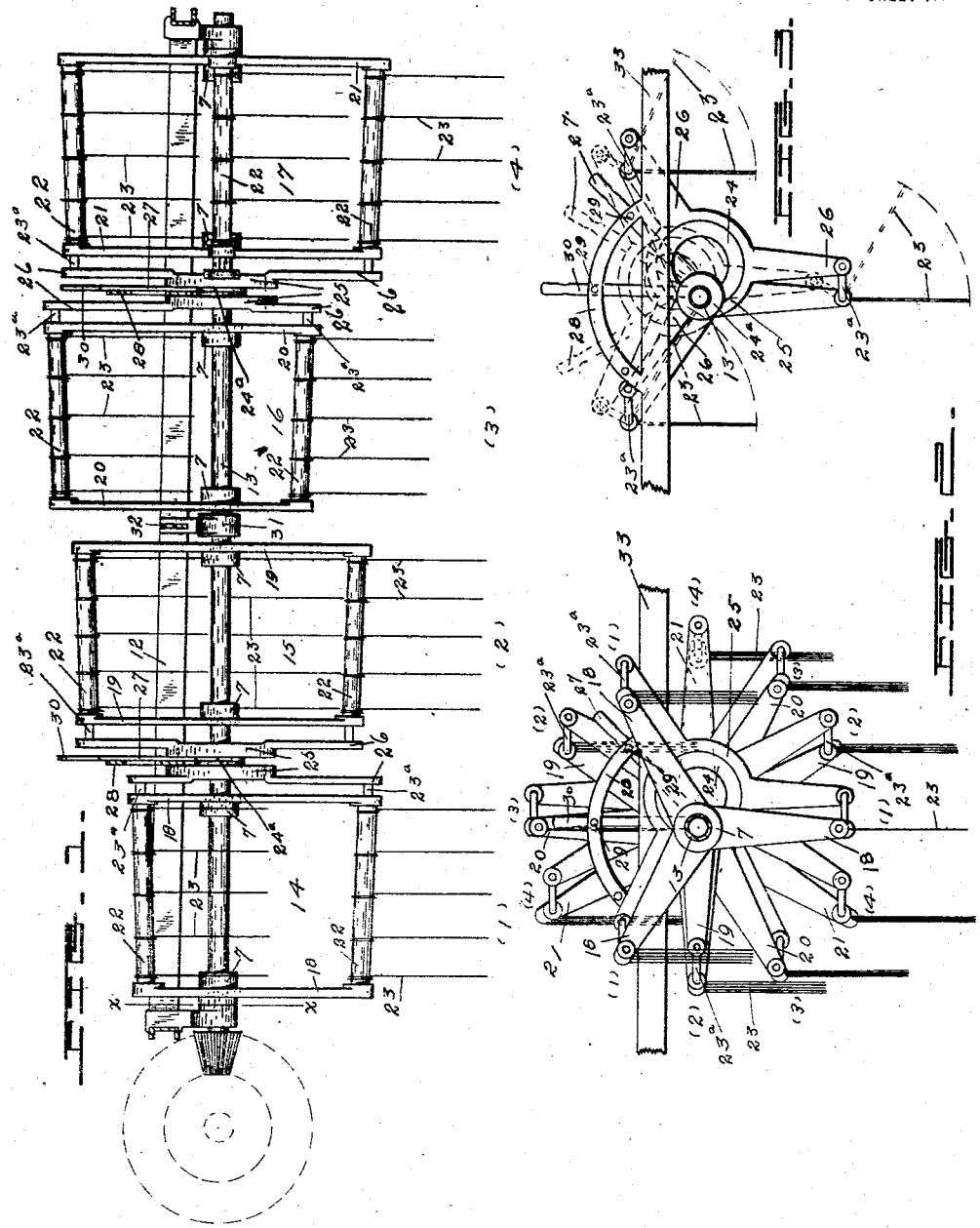
Witnesses
Inventor

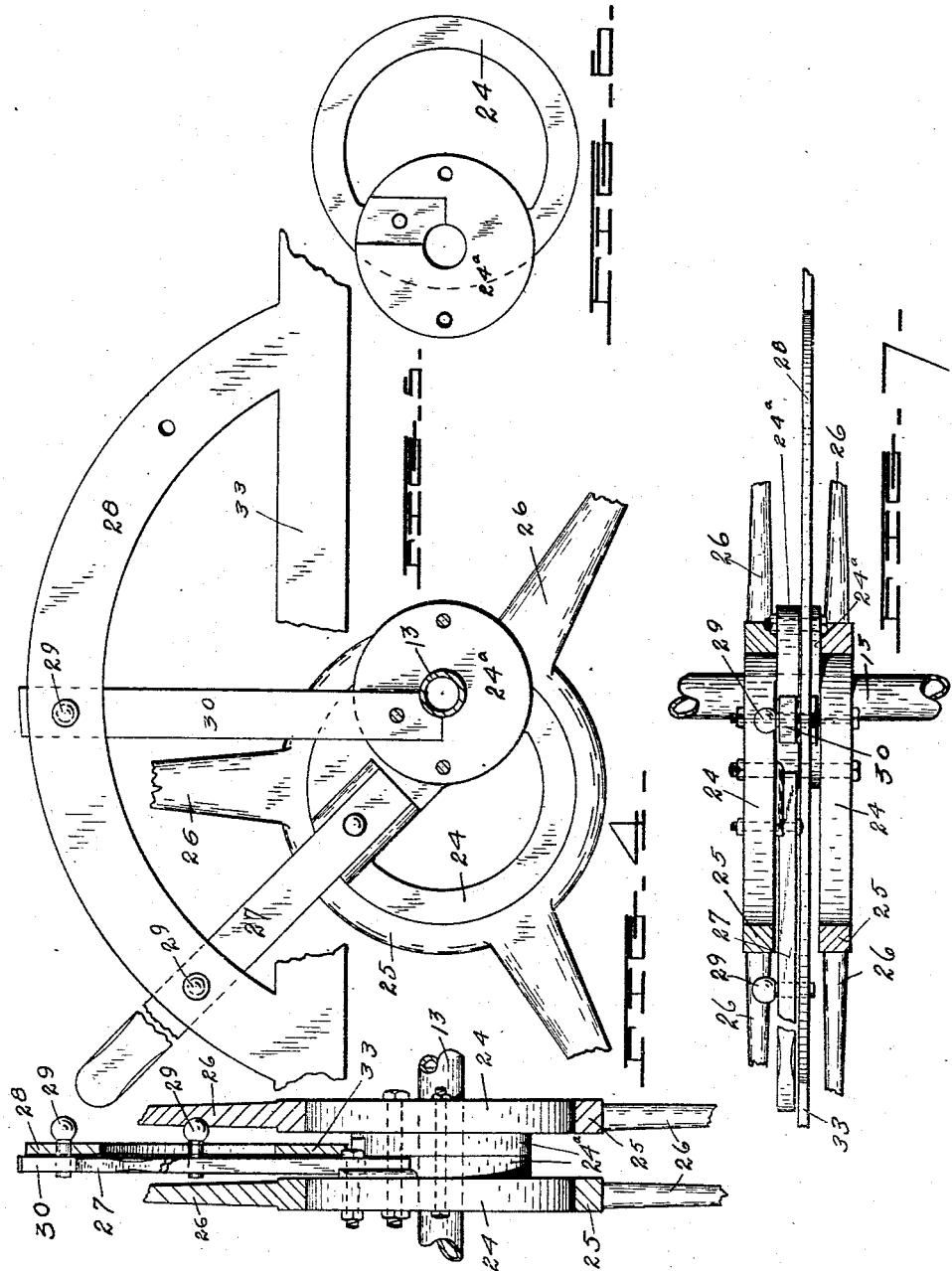

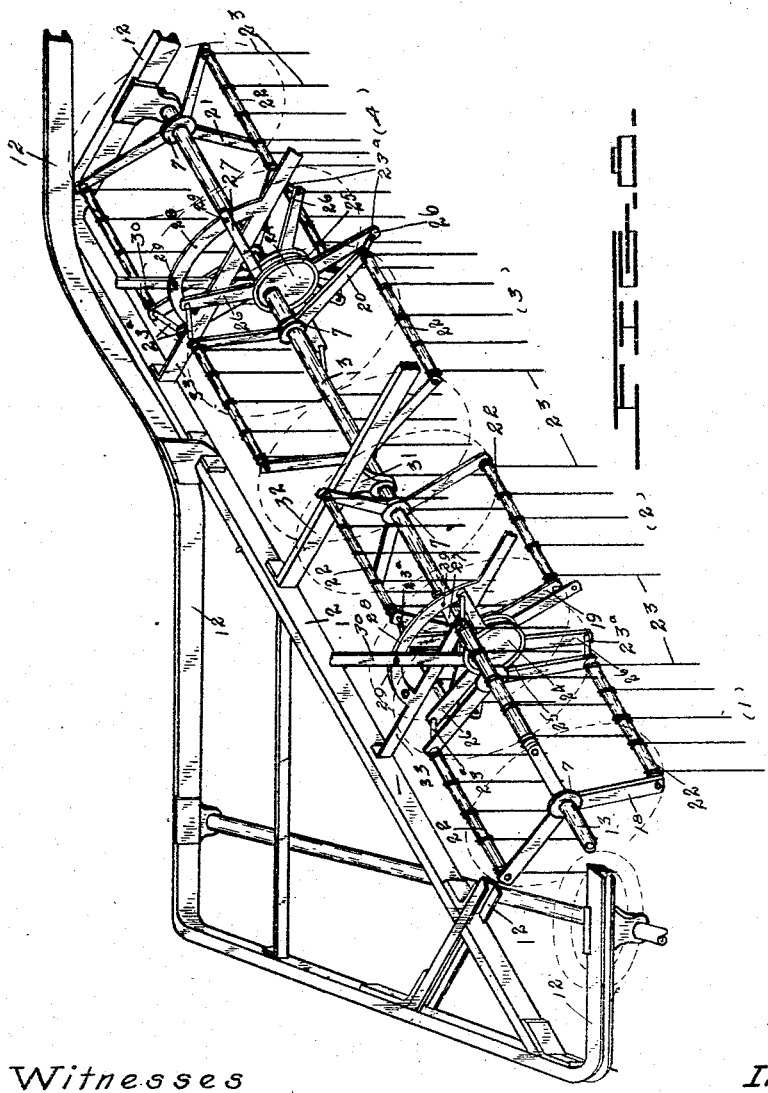

UNITED STATES PATENT OFFICE.

WILSON M. BERING, OF DECATUR, ILLINOIS.

CYLINDER-RAKE.

1,144,992.

Specification of Letters Patent.

Patented July 6, 1915.

Application filed February 27, 1911, Serial No. 611,132. Renewed August 14, 1913. Serial No. 784,793.

*To all whom it may concern:*

Be it known that I, WILSON M. BERING, a citizen of the United States, residing at Decatur, in the county of Macon and State of Illinois, have invented certain new and useful Improvements in Cylinder-Rakes, of which the following is a specification.

My invention relates to an improvement in hay rakes and it has special reference to cylinder side-delivery rakes.

The object of my invention is to produce a rake cylinder comprising a plurality of separate sections combined to produce a unitary whole, the raking parts of each section being so disposed relatively and timed to operate to produce the raking effect at different intervals. The purpose of this is to prevent roping of the hay or other material being raked, which occurs when raking with a continuous sweep of teeth extending the entire length of the single cylinder rakes commonly used.

A further object of my invention is to taper the cylinder from its most advanced position to its extreme rearwardly disposed end to facilitate a gradually longer sweep from the end in the advanced position to the end portion of the rake in the most rearward position, and to produce a gradually increasing length of rake forks, thereby providing a gradually increasing bearing surface to better handle the hay as it increases in volume from the forward or advanced end of the rake to the rearward or delivery end thereof.

A further object of my invention is to provide mechanism located between pairs of cylinders to control the direction of pointing of the rake sections.

Another object of my invention is to provide a support or supports for the rake cylinder shaft at points intermediate its length.

A further object of my invention is to provide cam means for shifting the position of the rake forks to cause them to bear at different desired angles to accommodate different conditions that are met with in the operation of the machine, and to shift the rake forks entirely out of the way so that there will be sufficient clearance between the ground and the ends of the forks as not to interfere in the transportation of the machine from one field to another.

My invention relates to other detail features hereinafter more particularly described.

In the drawings—Figure 1 is a side elevation showing the rake sections arranged on a common axis or shaft support and in working position; Fig. 2 is an end view of the cylinder; Fig. 3 is a detail view showing means for adjusting or changing the position of the eccentrics and the effect of such adjustment upon the rake arms and rake teeth; Fig. 4 is a detail side elevation showing the association of the eccentric adjusting means with the eccentrics and an arched stop plate with which the adjusting lever is adapted to be connected at different points; Fig. 5 is a side elevation of the same matter that is shown in Fig. 4; Fig. 6 is a detail view of the eccentric; Fig. 7 is a detail plan view of the same subject matter as shown in Figs. 4 and 5. Fig. 8 is a perspective view showing the rake in proper working position relative to the framework of the machine.

Referring to the figures, 12 refers to frame portions of the machine, only fragmentary parts being shown for the purpose of indicating the relative position of the cylinder to the frame.

13 is a rake cylinder shaft disposed angularly with relation to the frame, a driving connection therefor being shown at the left of Fig. 1. Rake sections 14, 15, 16 and 17 are fixed upon the common shaft 13 and are rotated thereby, in the operation of the machine. Each rake section is formed of side frame parts or spiders having a central hub portion 7, fixedly mounted on the shaft and from which extend radial arms as 18 for section 1, 19 for section 2, 20 for sections 3 and 21 for section 4. The radial arms of each section are arranged in parallel relation both longitudinally and vertically but the arms of the separate sections are arranged each at a different angle or staggered with the object and purpose of supporting the teeth in different planes so that they will come to the raking position at different times. The relative arrangement of the arms of the different sections is best illustrated in Figs. 2 and 8. In Fig. 2 numerals 1, 2, 3 and 4 refer to the arms of the sections 1, 2, 3 and 4 as they appear in Fig. 1, and Fig. 2 also shows the relative positions of the rake forks. The outer ends of the radial arms of each section are perforated and each set of arms of each section which lie in the same plane are connected by a rake head or bar as 22, with the ends of said bar bearing through the perforations in the arms at the sides of the sections. Rake teeth 23 are arranged in series and suitably secured to bars 22.

While I have shown four rake sections, each carrying three rake fork bars but in construction I may use only two rake sections and furthermore, each rake section may be made up of bars or arms adapted to carry two rake fork bars, the disclosure in the drawings merely representing one form of embodiment of my invention.

For the purpose of maintaining the rake heads 22 in a permanent position so that the teeth will point continuously in a given direction that they may be set to occupy, I provide the eccentrics 24 fixed to eccentric hubs 24$^a$, said eccentrics being adapted to embrace shaft 13, there being one provided between rake sections 1 and 2 and one between sections 3 and 4. The eccentrics are constructed so that they are each adapted to be embraced by two separate eccentric sheaves or rings, said eccentric rings being indicated as 25 and each being provided with three radial arms as 26, each arm provided with a perforation in the outer end thereof. The rake heads 22 or the ends thereof adjacent the arms of the eccentric rings 25, are extended beyond the supporting rake arms and bent into the form of a crank arm and are adapted to be entered in the perforations in the extremities of the eccentric ring arms to maintain a pivotal or turning relation therewith. The eccentrics 24 being loose upon shaft 13, it is necessary that they shall be supported in a permanent position, and to accomplish this fixing of the eccentrics, the levers 27 and arms 30 are provided, which are secured to the eccentrics, and extending in an upward direction are adapted to be connected with perforated arched plate or stop bar 28 by means of stop pins 29, which plate or bar may be suitably secured to the frame work of the machine at a point above shaft 13 and in a parallel relation with the sides of the sections, one being provided between sections 1 and 2 and another between sections 3 and 4. In addition to arms 27 and 30 providing a connection with the permanently fixed bar 28 to hold the eccentrics in a given position, they also serve as a support for shaft 13 at points intermediate its end supports in the frame of the machine, such intermediate support being of functional advantage as shaft 13, being necessarily long and being subjected to the weight of the rake sections and the natural working draft of the machine, would be liable to sag or bend if not so supported.

The eccentrics 24 may be set in any desired position for the purpose of changing the direction of pointing of the rake teeth 23 (see Fig. 3) by simply removing pin 29 and shifting the eccentric about its axle support 13 and fixing it in connection with suitable perforations provided in bar 28 into the desired position. Furthermore, the eccentric may be shifted at will of the operator so as to throw the rake teeth to an extreme incline rearward of the direction of travel of the machine in transportation so that they will be out of the way when the machine is being transported. I have shown means for only one adjustment but obviously the plate 28 may be provided with any number of adjusting perforations. The movement of eccentrics 24 will change the position of eccentric ring arms 26 with relation to the centers of support for the rake heads 22, thereby moving the crank arms 23$^a$, which movement being imparted to rake heads 22 will change the direction of bearing or pointing of rake teeth 23.

In the operation of the machine, as shaft 13 is turned, the rake sections will be revolved therewith, and as the eccentric arms 26 are connected through crank arms 23$^a$ with the ends of the rake heads 22, the eccentric rings 25 will be carried about the eccentrics 24 and in such movement the eccentric ring arms 26 will be moved to and from the rake cylinder shaft 13, thereby constantly changing their position relative to the centers of support of rake heads 22, which will effect a constant maintenance of the rake teeth in a permanent direction of pointing after the eccentrics have been fixed in any given position.

In carrying out my invention, the rake sections may be built as shown in the drawings, each with a taper converging gradually from the terminal end of the rake section at the delivery end of the cylinder to the end of the cylinder occupying the most advanced position. In such formation, it will be necessary to step the teeth at different lengths so that their outer ends will lie in the same horizontal plane when raking and it will also be necessary to incline shaft 13 so that as the sections are revolved, the rake teeth will meet the surface of the ground in a uniform, horizontal plane. The rake sections, however, may be made of uniform diameter supported on the inclined shaft, and in such case it will be necessary to gradually lengthen the rake teeth progressively from section 1 to 4. However, the principle of operation of the machine is not changed in thus carrying the construction of the rake sections.

In the drawings I have shown a center support for shaft 13 comprising a depending lug 31 connected with a frame bar 32 and likewise have shown arched plates 28 integrally united with frame bars 33, but any form of connection may be employed between shaft 13 and the framework of the machine that may be desired.

What I claim and desire to secure by Letters Patent of the United States is:

1. A rotary rake cylinder for side delivery hay rakes comprising in combination plural sections fixed on the reel shaft, each section formed of plural arm end pieces, the arms of each section arranged in pairs in parallel relation, and the arms of the several separate sections arranged relatively at different angles in progressive stepped relation from end to end of the rake cylinder, a rake head in each set of parallel arms in each section provided with rake teeth, a crank arm on each rake head, a normally stationary eccentric on the reel shaft between pairs of sections, and means turnable on the eccentrics and connected with the crank arms on the heads of the pairs of sections, whereby the movement of the rake section will maintain a permanent direction of pointing of the rake teeth in a given positioning of the eccentric.

2. A rotary rake cylinder for side delivery hay rakes comprising in combination plural sections fixed on the reel shaft, each section formed of plural arm end pieces, the arms of each section arranged in pairs in parallel relation and the arms of the several separate sections arranged relatively at different angles in progressive stepped relation from end to end of the rake cylinder, a rake head in each set of parallel arms in each section provided with rake teeth, a crank arm on each rake head, a normally stationary eccentric on the reel shaft between pairs of sections, eccentric straps on each eccentric provided with radial arms, the latter connected with the crank arms on the heads of pairs of sections.

3. A rotary rake cylinder for side delivery hay rakes comprising in combination plural sections fixed on the reel shaft, each section formed of plural arm end pieces, the arms of each section arranged in pairs in parallel relation and the arms of the several sections arranged relatively at different angles in progressive stepped relation from end to end of the rake cylinder, a rake head in each set of parallel arms in each section provided with rake teeth, a crank arm on each rake head, a normally stationary eccentric on the reel shaft between pairs of sections, eccentric straps on each eccentric provided with radial arms, the latter connected with the crank arms on the heads of pairs of sections, and means for holding the eccentrics from turning and for adjusting the same circumferentially of the reel shaft.

4. A rotary rake cylinder for side delivery hay rakes comprising in combination plural sections fixed on the reel shaft, each section formed of plural arm end pieces, the arms of each section arranged in pairs in parallel relation and the arms of the several sections arranged relatively at different angles in progressive stepped relation from end to end of the rake cylinder, a rake head in each set of parallel arms in each section provided with rake teeth, a crank arm on each rake head, a normally stationary eccentric on the reel shaft between pairs of sections, means turnable on the eccentrics and connected with the crank arms on the heads of pairs of sections, whereby the movement of the rake section will maintain a permanent direction of pointing of the rake teeth in a given positioning of the eccentric, and means for supporting the reel shaft intermediate its end supports.

5. In a hay rake, the combination of a rotary shaft normally upwardly inclined from its foremost end, a plurality of rotary sections mounted thereon, each section comprising a frame and rockable rake forks, the forks of the respective sections being disposed in different planes from those of the adjacent sections, said planes being progressively advanced from one end of the rake cylinder, and levers for simultaneously changing the angular adjustment of the forks of two adjacent sections.

6. In a hay rake, the combination of a rotary shaft normally upwardly inclined from its foremost end, a plurality of rotary rake sections mounted thereon, each section comprising a hub and radial arm extensions therefrom, transverse bars connecting the radial arms and rake forks rockably mounted on said bars, the forks of each section being disposed in different planes from the forks of the adjacent sections, said planes being progressively advanced from end to end of the rake cylinder, means for holding the forks normally against raking movement and manually operable means to change and refix the angular position of said forks.

7. In a hay rake, the combination of a transportable frame, a rotary shaft normally upwardly inclined from its foremost end, a plurality of rake sections mounted thereon, each rake section comprising a frame and rockable rake forks, the forks of the respective sections being disposed in different planes from those of the adjacent sections, said planes being progressively advanced from one end of the rake cylinder, eccentrics between the sections intermediate the ends of the shaft and loose thereon, eccentric ring arms on said eccentrics and transverse bars connecting the radial arms and the rake forks.

8. In a hay rake, the combination of a transportable frame, a rotary shaft normally upwardly inclined from its foremost end, a plurality of rake sections mounted thereon, each rake section comprising a frame and rockable rake forks, the forks of the respective sections being disposed in different planes from those of the adjacent sections, said planes being progressively advanced from one end of the rake cylinder, eccentrics between the sections intermediate the ends of the shaft and loose thereon, eccentric ring arms on said eccentrics, transverse bars connecting the radial arms and the rake forks, manually operable means connected with the eccentric rings to change and refix the angular position of said forks and the same means for supporting the shaft intermediate its ends.

9. In a hay rake, the combination of a transporting frame, a rotary shaft normally upwardly inclined from its foremost end, a plurality of rake sections mounted thereon, each rake section comprising a frame and rockable rake forks, the forks of the respective sections being disposed in different planes from those of the adjacent sections, said planes being progressively advanced from one end of the rake cylinder, eccentrics between the sections intermediate the ends of the shaft and loose thereon, eccentric ring arms on said eccentrics, transverse bars connecting the radial arms and the rake forks, a lever connected with each eccentric ring for changing and refixing the angular position of said forks and means comprising the eccentrics, the eccentric rings, the lever and an arched plate on the frame for supporting the shaft between its ends.

10. In a hay rake, in combination, a suitable rake frame, a rotatable shaft supported therein in an upwardly inclined position from its foremost end, a rake section rotatably supported on the shaft and disposed angularly with relation to the length of the framework, said section being tapered gradually from its most rearward position in the rake frame to its most advanced position therein.

11. A rotary rake cylinder for side delivery, hay rakes comprising a reel shaft, a plurality of rotary rake sections mounted thereon, each section comprising a plurality of series of rake teeth, the teeth on one section being in staggered relationship to those of the adjacent section, a normally stationary eccentric on said reel shaft between pairs of sections, and means controlled by said eccentric to maintain a permanent direction of pointing of the rake teeth during rotation of said rake sections.

12. A rotary rake cylinder for side delivery, hay rakes comprising a reel shaft, a plurality of rotary rake sections mounted thereon, each section comprising a plurality of series of rake teeth, the teeth on one section being in staggered relationship to those of the adjacent section, a normally stationary eccentric on said reel shaft between pairs of sections, means controlled by said eccentric to maintain a permanent direction of pointing of the rake teeth during rotation of said rake sections, and means for adjusting the position of said eccentric to thereby vary the point of said rake teeth.

In testimony whereof I have affixed my signature in presence of two witnesses.

WILSON M. BERING.

Witnesses:
J. FRANK DAVIS,
A. M. WIDICK.